(12) United States Patent
Swank (10) Patent No.: US 7,827,264 B2
(45) Date of Patent: Nov. 2, 2010

(54) SYSTEMS AND METHODS FOR MANAGING COMPUTER SYSTEMS

(75) Inventor: Creighton R. Swank, Washington, IL (US)

(73) Assignee: Caterpillar Inc, Peoria, IL (US)

(*) Notice: Subject to any disclaimer, the term of this patent is extended or adjusted under 35 U.S.C. 154(b) by 251 days.

(21) Appl. No.: 11/711,666

(22) Filed: Feb. 28, 2007

(65) Prior Publication Data

US 2008/0209022 A1 Aug. 28, 2008

(51) Int. Cl.
G06F 15/16 (2006.01)
G06F 15/173 (2006.01)

(52) U.S. Cl. .................. 709/223; 709/224; 709/248

(58) Field of Classification Search ......... 709/208–211, 709/223–224, 248
See application file for complete search history.

(56) References Cited

U.S. PATENT DOCUMENTS

| | | | |
|---|---|---|---|
| 6,631,115 B1* | 10/2003 | Sendelbach et al. ......... | 370/229 |
| 6,912,572 B1 | 6/2005 | Fischer | |
| 2002/0188709 A1* | 12/2002 | McGraw et al. ............. | 709/223 |
| 2005/0027842 A1* | 2/2005 | Kline ........................... | 709/223 |

OTHER PUBLICATIONS

Ford et al., Building a Linux HPC Cluster with xCAT, Sep. 2002, IBM.*
Hochstetler et al., Linux Clustering with CSM and GPFS, Jan. 2004, IBM.*
Ellsworth et al., Using IBM Cluster Systems Management (CSM) for Linux in xCAT environments, IBM.*
Ouellette, Paranoid Penguin—Managing SSH for Scripts and Cron Jobs, Jul. 28, 2005, Linux Journal http://www.linuxjournal.com/article/8257.*
cogNiTioN, Newbie: Intro to cron, Dec. 30, 1999.*
Brent Chun, "pssh HOWTO," from http://www.theether.org/pssh/docs/0.2.3/pssh-HOWTO.html, as printed on Feb. 27, 2007, pp. 1-4.
"Linux at Livemore," from http://www.llnl.gov/linux/pdsh/, as printed on Feb. 27, 2007, p. 1.
xCAT, "Extreme Cluster Administration Toolkit," from http://www.xcat.org, as printed on Feb. 27, 2007, pp. 1-2.
Wikipedia, "Secure Shell," from http://en.wikipedia.org/wiki/Secure_Shell, as printed on Feb. 28, 2007.

* cited by examiner

Primary Examiner—Nathan Flynn
Assistant Examiner—James E Conaway (57) ABSTRACT

A method of managing a plurality of computer systems is disclosed. The method includes using one or more scripts to provide a list of n computer system identifiers corresponding to n computer systems, wherein n is an integer greater than 1. The method further includes establishing concurrent management sessions between a base computer system and a plurality of the n computer systems, and determining whether the total number of established management sessions between the base computer system and the plurality of computer systems is greater than a threshold amount. If the total number of determined management sessions is greater than the threshold amount, the method additionally includes waiting for a predetermined period of time before attempting to establish any additional management sessions.

20 Claims, 4 Drawing Sheets

SYSTEMS AND METHODS FOR MANAGING COMPUTER SYSTEMS

TECHNICAL FIELD

The present disclosure relates generally to systems and methods for managing computer systems, and more particularly to methods and systems for managing computer systems over a network using the secure shell (SSH) protocol.

BACKGROUND

Distributed computing systems such as distributed server systems often contain hundreds or even thousands of computer systems. These systems are typically managed (e.g., monitored and/or configured) using one or more methods. For example, one existing management method permits a user to remotely log on to each computer system in a network individually, and to manually monitor and configure each computer system from a remote location. This process can take hours, or even days, in a distributed computing system having hundreds or thousands of computer systems. The process also requires an administrator to manually enter all information for each computer system in the distributed system, which creates a large probability for error in managing the network.

Another existing method automates certain of the manual tasks that would normally be performed by administrators. One method creates an automated loop that runs certain script on a number of servers in a serial manner. However, this method still requires that each computer be separately and individually accessed, such that the time required to monitor and configure an entire system could still take many hours.

A third existing management method installs agent programs on all computer systems in the network. The agent programs are capable of running certain scripts on each computer system in order to configure and to gather information from the computer system. For example, one system, described in U.S. Pat. No. 6,912,572 B1, issued to Fischer, loads "plugins" into a number of servers on a network in order to gather information from the servers. Using agents, an administrator need not manually enter every management instruction, but can leave certain management tasks up to the agent programs. However, these agent systems may suffer from various drawbacks. For example, the agent programs must typically be individually installed on every computer system being managed in the network. Furthermore, changes to the agent programs in some systems must be made individually, which requires much time and effort. These agent programs may also lack important security features that prevent unauthorized access and other tampering. In addition, because the computer systems in the network may run on different platforms, these agent programs tend to be complex and difficult to manage.

The disclosed management system and method is directed to overcoming one or more of the problems set forth above.

SUMMARY OF THE INVENTION

In one embodiment, a method of managing a plurality of computer systems is disclosed. The method includes using one or more scripts to provide a list of n computer system identifiers corresponding to n computer systems, wherein n is an integer greater than 1. The method further includes establishing concurrent management sessions between a base computer system and each of a plurality of the n computer systems, and determining whether the total number of established management sessions between the base computer system and the plurality of computer systems is greater than a threshold amount. If the total number of determined management sessions is greater than the threshold amount, the method additionally includes waiting for a predetermined period of time before attempting to establish any additional management sessions.

In another embodiment, a method of managing a plurality of computer systems using SSH is disclosed. The method includes selecting a main program script to execute at a base computer system, and selecting at least one of a pre-script and a post-script to execute at the base computer system. The method further includes executing the main program script at the base computer system, the executed main program script causing the base computer system to send instructions via SSH to at least two of the plurality of computer systems and causing the at least two computer systems to perform the same tasks concurrently.

In an another embodiment, a base computer system is disclosed. The base computer system includes one or more processors, a user interface, and a program script. The program script is configured to cause the one or more processors to perform certain steps. One step includes providing a list of n computer system identifiers corresponding to n computer systems, wherein n is an integer greater than 1. A second step includes establishing concurrent management sessions between the base computer system and each of a plurality of the n computer systems. A third step includes determining whether the total number of established management sessions between the computer system and the plurality of computer systems is greater than a threshold amount. A fourth step includes, if the total number of determined management sessions is greater than the threshold amount, waiting for a predetermined period of time before attempting to establish any additional management sessions.

DETAILED DESCRIPTION

Figure 1:
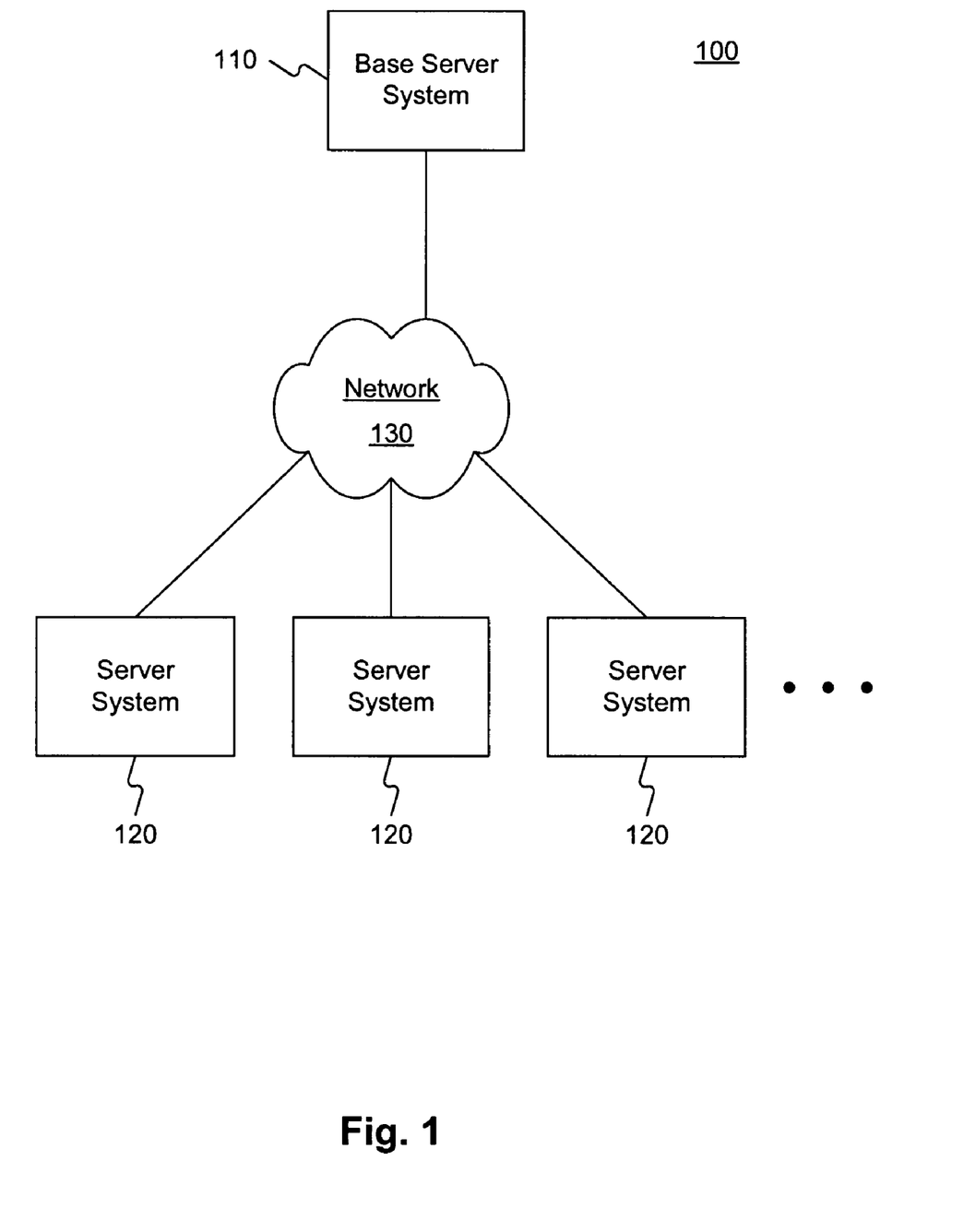
FIG. 1 is a block diagram illustrating an exemplary distributed computing system consistent with certain disclosed embodiments.

FIG. 1 depicts an exemplary distributed computing system 100 for implementing one or more of the disclosed methods. System 100 includes a plurality of computer systems. In one embodiment, the plurality of computer systems may include a base server system 110 and a plurality of distributed server systems 120 connected by a network 130.

In one embodiment, each of server systems 110 and 120 in distributed computing system 100 may include hardware (e.g., one or more processors, memory storage, buses, network interface cards, etc.), software (e.g., operating system, applications, etc.), and/or firmware for implementing one or more of the disclosed methods and/or for implementing other server functions. Server systems 110 and 120 may each include a single computer, a plurality of computers (e.g., server clusters), or portions of a computer (e.g., blade servers). In one embodiment, the server systems 110 and 120 may be used to provide information to client systems or other server systems on a network. Each server system 110 and 120 may be monitored and/or configured according to one or more of the disclosed methods. Base server system 110 may be used by an administrator who inputs certain information in order to manage the server systems 120 in system 100. In one embodiment, base server system 110 includes one or more input devices and/or display devices that permit a user (e.g., an administrator) to input and view information related to the management of computer systems 120. For example, base server system 110 may include a graphical user interface or text-based interface that permits a user to input and view data. Although base server system 110 is depicted in FIG. 1 as a particular computer system within distributed computing system 100, any one of server systems 120 in system 100 may serve as a base server system.

Network 130 may be any network (e.g., Internet, intranet, LAN, WAN, etc.) that provides communications between server systems 110 and 120. Network 130 may include any combination of media (e.g., wired, fiber optic, wireless, etc.) capable of providing communications between computer systems. In one embodiment, server systems 110 and 120 may each include a particular operating system capable of establishing one or more management sessions over network 130 via one or more communication protocols. For example, in one embodiment, server systems 110 and 120 may include UNIX servers that communicate via the secure shell (SSH) protocol. The SSH protocol provides a secure communication channel (e.g., using one or more passwords, private/public key pairs, etc.) between a local and remote computer over the network 130. However, other operating systems (e.g., Linux™, HP-UNIX™, Sun OS™, etc.) and communication protocols may be used.

The methods and systems described herein provide a framework that allows a system administrator to easily select and/or automate tasks associated with management and monitoring of a plurality of computer systems (e.g., server systems) across a network. A number of scripts (e.g., commands and programs) may be created that implement certain tasks on distributed computing systems. In one embodiment, a main program script runs on a base computer system (e.g., base server system 110), and causes management tasks to be executed concurrently on a plurality of distributed computing systems (e.g., distributed server systems 120).

In one embodiment, the main program script may include code that instructs the base server 110 to establish a plurality of concurrent management sessions with a plurality of respective server systems 120. The main program script may additionally include code that, for each management session, calls or includes one or more management scripts that may be passed to the server systems 120 to instruct the server systems 120 to carry out one or more management tasks.

The management scripts included in the main program script may be instructions themselves, or may be references to additional code (e.g., pre-written code) that includes instructions for executing the tasks. In one embodiment, the management scripts may include instructions to gather information from one or more server systems 120. For example, one management script may indicate which server systems to poll (e.g., all servers having certain types of operating systems). Another management script may indicate a particular type of information to retrieve from each polled server (e.g., the amount of RAM available on the server, world wide name of an installed fiber card, etc.). A third management script may instruct the polled servers where to send the retrieved information (e.g., to a particular directory on the base server). For example, outputs for each polled server system 120 may be stored in individual files in a designated directory at base server system 110, or at one or more other locations.

Any number of management scripts may be included in or referred to by main program scripts in order to implement desired management tasks. Other management scripts may perform additional management tasks. The management scripts described above are exemplary only, and may be combined into one script, combined with other scripts, or configured in other ways. For example, in one embodiment, one or more management scripts may be combined into a single set of management scripts, which may be sent to one or more server systems 120 to instruct the one or more server systems 120 to carry out one or more tasks.

Other exemplary management scripts may include commands that instruct one or more server systems 120 to perform one or more configuration tasks. For example, a management script may instruct a group of server systems 120 to update information or change memory allocations (e.g., change times or dates on the servers, update memory sizes available at the servers, etc.).

Certain management scripts, referred to as pre-scripts, may be executed before any management connections are made between base server system 110 and server systems 120. These scripts may be included in the main program script, either as instructions themselves or as references to additional code that includes the instructions. In one embodiment, pre-scripts may include instructions that cause base server system 110 to perform certain tasks (e.g., retrieving a list of servers to be polled, backing up data stored in base server system 110 in an archive, etc.).

Other management scripts, referred to as post-scripts, may be executed after all connections to server systems 120 are terminated. Post-scripts may also be included in the main program script, either as instructions themselves or as references to additional code that includes the instructions. Post-scripts may instruct the base server system 110 how to handle the data it receives. For example, in one embodiment, post-scripts may instruct the base server system 110 to analyze received data (e.g., determine which outputs to filter and/or store in a database, determine which server systems have failed or are misconfigured, etc.), and may determine which actions to take in response to the received data (e.g., issue alerts, incident tickets, or notification flags, etc.).

Figure 2:
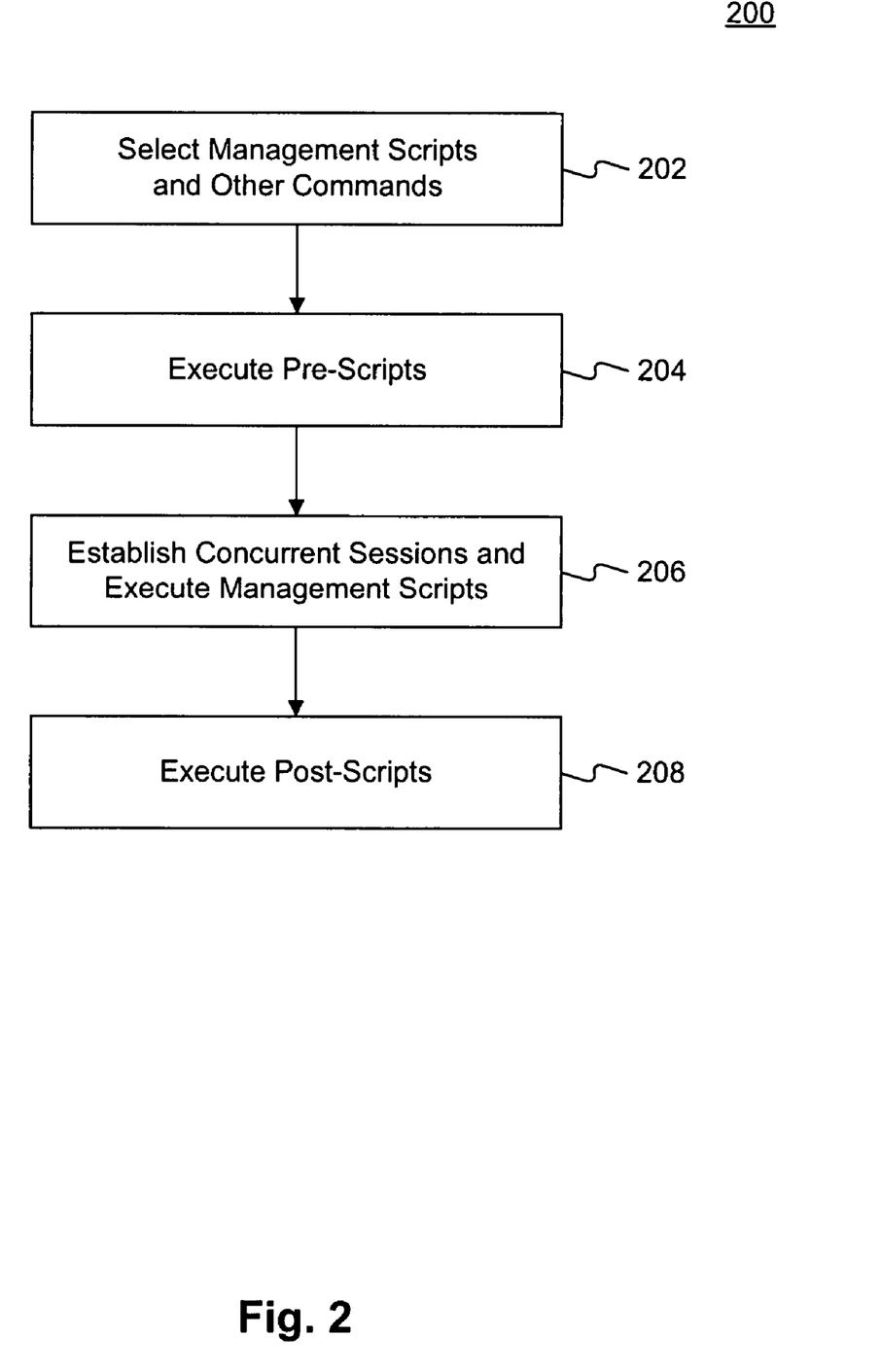
FIG. 2 is a flow chart illustrating an exemplary management method consistent with certain disclosed embodiments.

FIG. 2 depicts an exemplary method 200 of managing a plurality of distributed computing systems consistent with certain disclosed embodiments. At step 202, an administrator specifies a main program script, which may include certain management scripts (e.g., pre-scripts, post-scripts, and other scripts), and optionally specifies additional management scripts to execute. In one embodiment, an administrator selects these scripts by entering commands into a user interface, such as a command line interface. For pre-written scripts, the administrator may simply enter a text string that indicates, for example, where the code associated with the pre-written script is stored. In this way, the administrator does not need to know the detailed coding of each individual script, but need only know a name or text string associated with the desired script. For example, the administrator may enter a "post-script" command that designates the location of one or more post-script code files to execute, may enter a "pre-script" command that designates the location of one or more pre-script code files to execute, etc.

As an alternative or supplement to using pre-written scripts, the administrator may also individually create scripts and/or select certain tasks to execute (e.g., may select a "list" command that determines which servers to poll, may select a "show empty" command that creates an empty results file for servers that return no results, etc.). Although the above embodiments describe an administrator as selecting scripts and commands to execute, an administrator is not necessary. In one embodiment, an automated process may select which scripts to execute and which tasks to perform. For example, base server system 110 may be programmed to include one or more scheduled scripts that execute automatically at designated times.

After the administrator or an automated process selects the scripts and commands to execute, any selected pre-scripts may be executed (step 204). In one embodiment, the pre-scripts are executed on the base server system 110 and execute before any connections are made to server systems 120. As described above, the pre-scripts may perform certain tasks on base server 110 (e.g., retrieve a list of servers to be polled, back up data stored in base server system 110 into an archive, etc.). After the pre-scripts have executed, the method continues to step 206.

At step 206, the main program script is executed, concurrent sessions are established between the base server system 110 and server systems 120, and management scripts are run which instruct the server systems 120 carry out the designated tasks. In one embodiment, the main program script is stored and executed on base server system 110 or from a particular location designated by base server system 110. This avoids the need to include agents on every server system 120 in the distributed computing system 100, and increases the ease with which changes to the script may be made. To implement concurrent sessions, the base server system 110 initiates connections to each selected server system 120 (e.g., to each listed server in a list created by executing a "list" script) without waiting for tasks on each server system 120 to complete. This saves time in systems that have hundreds of servers, where each server may require a few minutes to execute a task. The concurrent connections need not be initiated at exactly the same time (e.g., they may be initiated microseconds or nanoseconds apart, according to the base server system 110's processing speed), but the execution of the main program script and additional management scripts associated with the connections may overlap (e.g., execute simultaneously). In one embodiment, each concurrent session may be implemented by the same main program script operating as a thread on base server system 110. Accordingly, base server system 110 may spawn a number of threads that execute at the same time. In this way, hundreds of server systems 120 may execute the desired tasks in parallel, rather than serially. In one embodiment, the use of concurrent sessions increases the speed of system management tasks from hours to just minutes. The process for creating concurrent sessions is described in greater detail in FIGS. 3A and 3B.

In one embodiment, the same script or set of scripts may be used to manage server systems 120, even if some of the server systems 120 use different operating systems. For example, the main program script and/or one or more management scripts may include code having instructions for determining the type of operating system running on each server system 120 (e.g., by querying the server system). The main program script and/or management scripts may further include a series of if-then statements, each statement including instructions tailored to a specific operating system. Accordingly, only the instructions for a particular operating system will be executed for those types of operating systems. This permits the same script or set of scripts to be used to manage server systems having different types of operating systems, thereby causing the different types of server systems to perform the same management tasks.

In step 208, any selected post-scripts may be executed. As described above, post-scripts may instruct the base server system 110 how to handle the data it receives. For example, in one embodiment, post-scripts may instruct the base server system 110 to analyze received data (e.g., determine which outputs to filter and/or store in a database, determine which server systems have failed or are misconfigured, etc.), and may determine which actions to take in response to received data (e.g., issue alerts, incident tickets, or notification flags, etc.). Post-scripts may include other instructions as well. After the post-scripts are executed, the method ends, and the server system 110 may wait for the next set of scripts and commands.

Figure 3A:
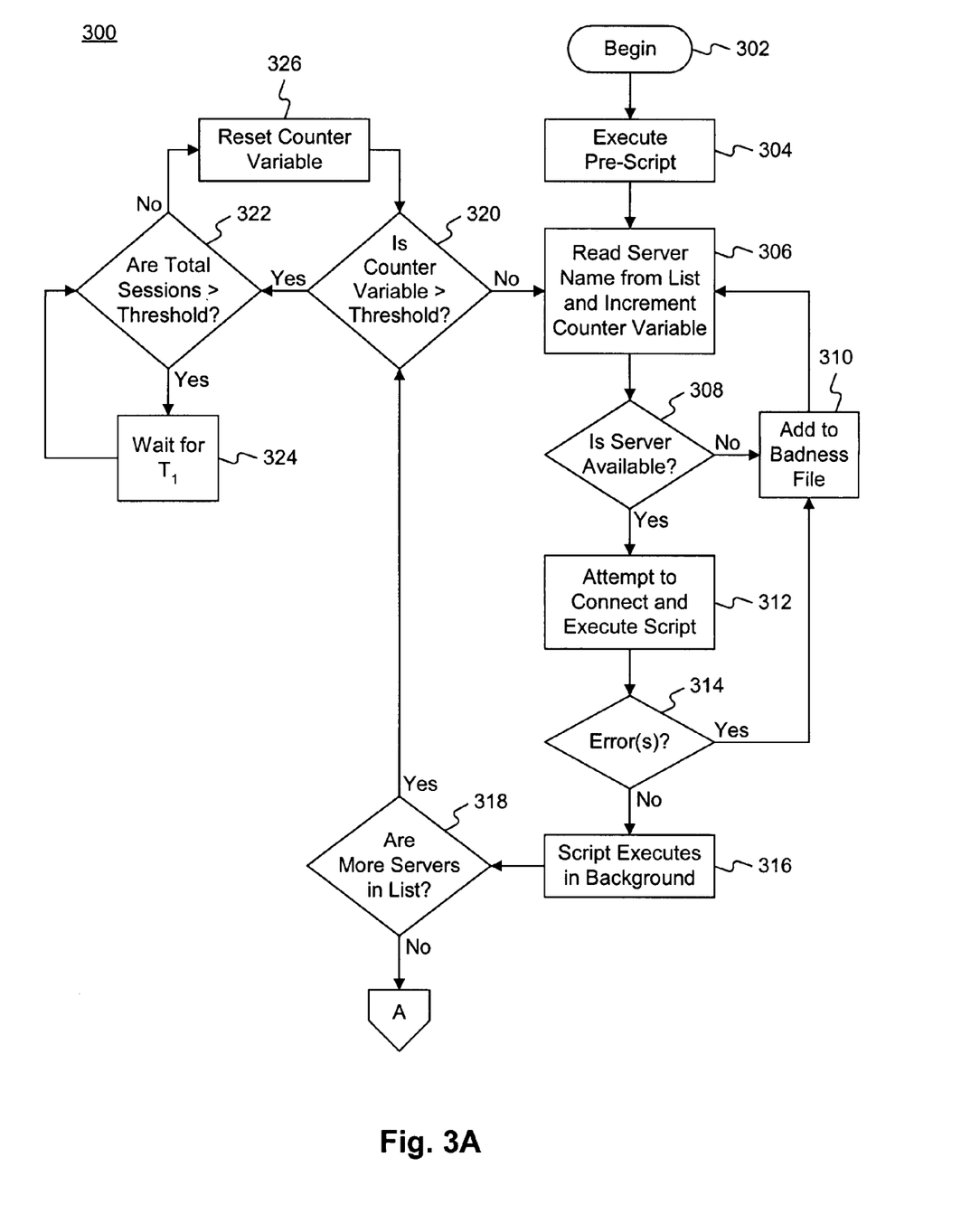
FIGS. 3A and 3B are flowcharts further illustrating an exemplary management method consistent with certain disclosed embodiments.
Figure 3B:
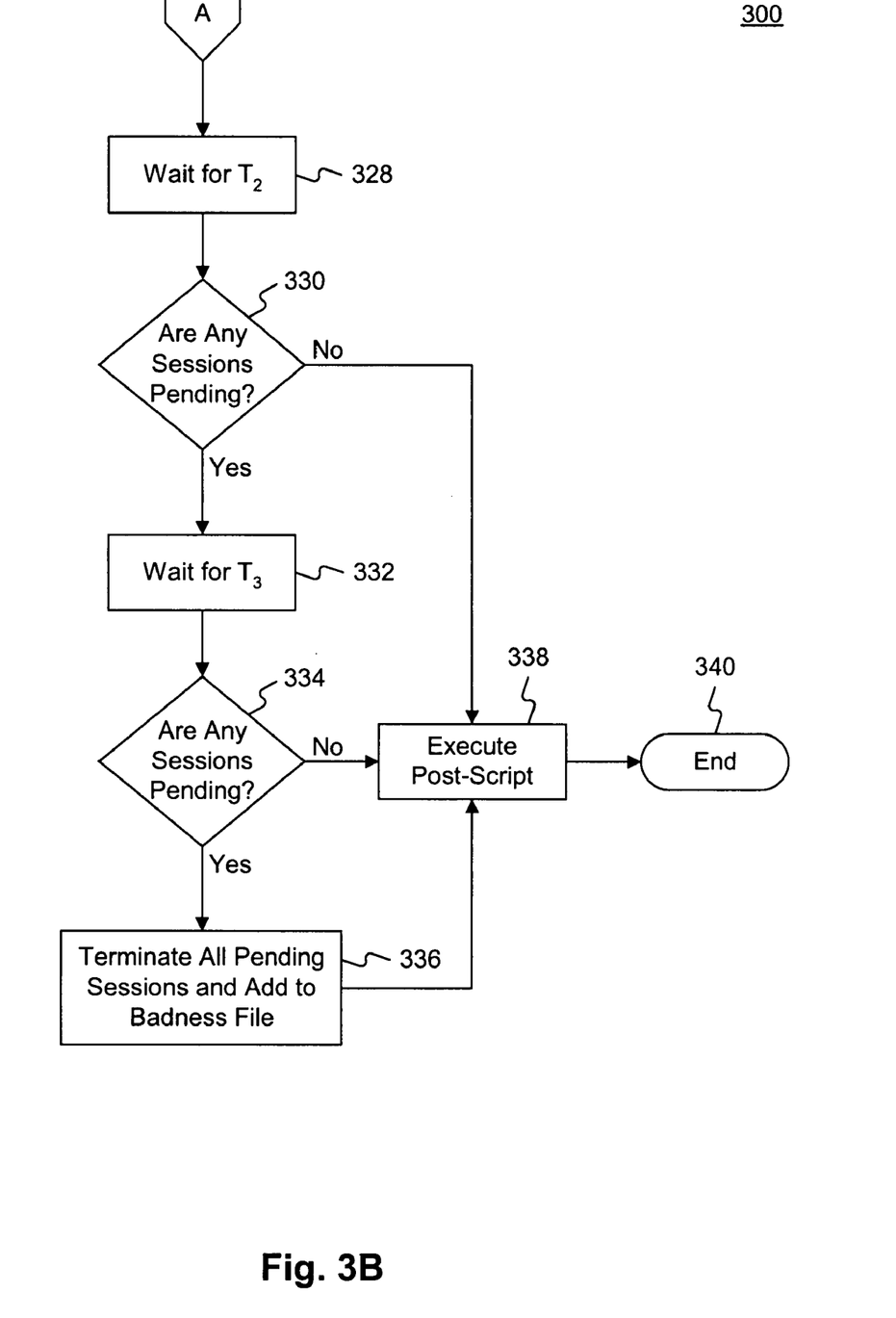

FIGS. 3A and 3B illustrate an exemplary method for executing concurrent sessions between a base server system 110 and a plurality of server systems 120 consistent with certain disclosed embodiments. In one embodiment, the method may be implemented by a UNIX script that utilizes SSH, or by another main program script running on a computer system such as base server system 110. The method begins at step 302, which may correspond to step 202 or immediately after step 202 in FIG. 2. At step 304, the main program script executes any selected pre-scripts, as described above in connection with step 204 of FIG. 2. For example, one pre-script may instruct server system 110 to retrieve a list of server system names (e.g., IP addresses, text-based names, or other identifier) corresponding to a number of server systems 120 to access during a management session. If no pre-scripts were selected, then none are executed.

At step 306, the main program script instructs server system 110 to read a first server name or other computer system name from a list of server names or other computer system names to be managed. The list may include any number of names of computer systems to be managed. After the first name is read, a counter variable, which may initially be set to 0, increments by one. Method 300 then continues to step 308, where the main program script instructs server system 110 to determine whether the first listed server is available. In one embodiment, for example, availability may be determined by the server system 110 pinging the first listed server to determine if it responds. If the server does not respond or the response is delayed or indicates an error (step 308, no), then the name of the first server may be added to a "badness" file (step 310). The badness file may be accessed or used later to report on or analyze the distributed computing system 100. The main program script then instructs server system 110 to read the next listed server (step 306) and increment the counter variable by one. The process then continues again to step 308.

If, however, the first named server is available (step 308, yes), then the main program script instructs the server system 110 to attempt to connect to the first named server (e.g., by opening a persistent connection), and initiate execution of one or more management scripts (step 312). At step 314, the main program script may instruct server system 110 to determine whether the management session is executing properly or whether it has encountered one or more errors. If one or more errors are encountered (e.g., an incorrect logon password or no password is entered, an encryption key is invalid or not cached, the connection is corrupted, etc.), then the first listed server may be added to the badness file (310), the next listed server is read and the counter variable is incremented by one (step 306). The process then continues again to step 308.

If, on the other hand, the management session is executing properly (step 314, no), then the process continues to step 316, where the main program script may pass one or more management scripts to the first named server, and may then continue to execute in the background until any associated management scripts and tasks are complete. At step 318, the main program script instructs server system 110 to determine whether more servers are included in the server list. If so, the main program script instructs server system 110 to determine whether the counter variable exceeds a pre-determined threshold value (step 320). This threshold value may be set to any desired value (e.g., 10, 50, 100). If the counter variable does not exceed the threshold (step 320, no), then the next server on the list is read from the list and the counter variable is incremented by one (step 306). If, however, the counter variable at step 320 exceeds the threshold value (step 320, yes), then the process continues to step 322.

At step 322, the main program script instructs server system 110 to check whether the total number of management sessions at base server system 110 is above a particular threshold. The threshold may be set, for example, based on an optimum number of management sessions (e.g., 250, 500, 750, etc.) that can be run simultaneously by server system 110 to achieve the fastest response time in managing the server systems 120. If the total number of management sessions is above the threshold amount (step 322, yes), then the main program script instructs server system 110 to wait for a pre-determined period of time (e.g., 5 seconds, 10 seconds, 30 seconds, etc.) to allow some of the sessions to terminate (e.g., for all tasks of the session to be completed). After the predetermined period of time (step 324), server system 110 checks again to determine whether the total number of management sessions is above the threshold amount. This loop continues until the number of sessions is below the threshold amount (step 322, no), at which point (step 326) the counter variable is reset (e.g., set to 0), and the program continues again with step 320.

If at step 318, server system 110 determines that all servers in the list have been accounted for (step 318, no), then method 300 continues to step 328, where the main program script instructs server system 110 to wait for a predetermined time period (e.g., 15 seconds, 30 seconds, 40 seconds, etc.) to allow some of the management sessions to terminate. In one embodiment, if there are still sessions pending (step 330, yes), then the main program script instructs server system 110 to pause for another predetermined time period (e.g., 2 minutes, 3 minutes, 4 minutes, etc.) to allow additional pending management sessions to terminate. In one embodiment, at step 334, the main program script instructs server system 110 to again determine whether any pending sessions remain. If so, the server system 110 may terminate all pending management sessions (step 336), and may optionally add a record of these terminated connections to the badness file. After all management sessions are terminated (step 330, no; step 334, no; or after step 336), any selected post-scripts may be executed (step 338), such as, for example, the post-scripts described above in connection with FIG. 2. If no post-scripts were selected, then none are executed. After the execution of all post-scripts are complete, or if none were selected, method 300 ends (step 340).

The above steps are described for exemplary purposes only. Not all of the steps are required to implement the methods of the disclosed embodiments. In addition, the time limits and threshold values described above are also exemplary. Any time limits or threshold values may be used as desired by an administrator or other entity that sets up the management system. In one embodiment, optimal time limits and threshold values are selected that provide optimal response time and/or avoid overloading the base server. The optimal time limits and threshold values may be determined, for example, from an analysis of historical response times, related time limits and threshold values, etc. Furthermore, any appropriate interface may be used to permit an administrator or other entity to select scripts and other commands to execute. For example, in one embodiment, a text-based UNIX interface that permits users to input data and commands (e.g., via a command line) may be used.

INDUSTRIAL APPLICABILITY

The system and method of the disclosed embodiments may be used for any network that includes computer systems that may be managed from a remote computer system. For example, in one embodiment the disclosed management methods may be used to manage servers configured to communicate via the SSH protocol. The servers may use different operating systems (e.g., UNIX, Linux, Sun OS, etc.), and may be connected over any network, such as the Internet, an intranet, a LAN, a WAN, etc. In one embodiment, any one of a plurality of server systems on a network may serve as the base server system described above. In some embodiments, the disclosed management methods may be used to manage client systems or other computer systems on a network in addition to or instead of server systems.

It will be apparent to those skilled in the art that various modifications and variations can be made to the computer management system and method described herein. Other embodiments will be apparent to those skilled in the art from consideration of the specification and practice of the disclosed computer management system and method. It is intended that the specification and examples be considered as exemplary only, with a true scope being indicated by the following claims and their equivalents.

What is claimed is:

1. A method of managing a plurality of computer systems, comprising:
    selecting a main program script to execute at a base computer system;
    selecting at least one of a pre-script and a post-script to execute at the base computer system; and
    executing the main program script at the base computer system, the executed main program script causing the base computer system to send instructions to a plurality of n computer systems and causing the plurality of n computer systems to perform the same management tasks concurrently, wherein executing the main program script causes the base computer system to perform operations including:
        using one or more scripts to provide a list of n computer system identifiers corresponding to the plurality of n computer systems;
        attempting to establish concurrent management session between the base computer system and the plurality of the n computer systems;
        determining whether a total number of the plurality of computer systems having an attempted management session with the base computer system is greater than a first threshold amount;
        when the total number of the plurality of computer systems having an attempted management session with the base computer system is greater than the first threshold amount, determining an actual number of established management sessions;
    when the actual number of established management sessions is greater than a second threshold amount, waiting for a predetermined period of time before attempting to establish an additional management sessions with any remaining computer systems of the n computer systems.
2. The method of claim 1, wherein the management sessions use the SSH protocol.

3. The method of claim 1, wherein the main program script causes the plurality of computer systems to perform management tasks that return data to the base computer system, and after completion of the management tasks, executes one or more post scripts at the base computer system that perform analysis of the returned data.

4. The method of claim 3, further including:
selecting the one or more post-scripts prior to attempting to establish any of the management sessions between the base computer system and the plurality of computer systems.

5. The method of claim 3, further including:
selecting one or more pre-scripts prior to attempting to establish any of the management sessions between the base computer system and the plurality of computer systems; and
executing the one or more pre-scripts prior to attempting to establish any of the management sessions between the base computer system and the plurality of computer systems.

6. The method of claim 1, wherein the n computer systems include at least two types of operating systems, and wherein the concurrent management sessions are established by executing one or more scripts, including at least one script that is configured to cause each of the at least two types of operating systems to perform the same management tasks.

7. The method of claim 1, further including:
reading a set of the n computer system identifiers from the list of n computer system identifiers;
incrementing a counter variable after each computer system identifier from the set is read; and
using the counter variable to determine whether the total number of the plurality of computer systems having an attempted management session with the base computer system is greater than the first threshold amount.

8. A method of managing a plurality of computer systems using SSH, comprising:
selecting a main program script to execute at a base computer system;
selecting at least one of a pre-script and a post-script to execute at the base computer system; and
executing the main program script at the base computer system, the executed main program script causing the base computer system to send instructions via SSH to a plurality of n computer systems and causing the plurality of n computer systems to perform the same tasks concurrently, wherein executing the main program script causes the base computer system to perform operations including:
using one or more scripts to provide a list of n computer system identifiers corresponding to the n computer systems, wherein n is an integer greater than 1;
attempting to establish establishing concurrent management sessions between the base computer system and the plurality of the n computer systems;
determining whether the a total number of the plurality of computer systems having an attempted management session with the base computer is greater than a first threshold amount;
when if the total number of the plurality of computer systems having an attempted management session with the base computer is greater than the first threshold amount, determining an actual number of established management sessions;
when the actual number of established management sessions is greater than a second threshold amount, waiting for a predetermined period of time before attempting to establish any additional management sessions with any remaining computer systems of the n computer systems.

9. The method of claim 8, wherein the base computer system and the plurality of computer systems are servers.

10. The method of claim 8, wherein one or more pre-scripts are selected and executed and include one or more of:
a pre-script that instructs the base computer system to select a list of computer systems to send the instructions to, and a pre-script that instructs the base computer system to store information in an archive.

11. The method of claim 8, wherein one or more post-scripts are selected and executed and include one or more of:
a post-script that instructs the base computer system to determine which computer systems are failed or misconfigured; a post-script that instructs the base computer system to issue alerts, incident tickets, or notification flags; and a post-script that instructs the base computer system to store received data in a database.

12. A base computer system, comprising:
one or more processors;
a memory;
a user interface; and
a program script executing at the base computer system;
the program script configured to cause the one or more processors to perform the steps of:
providing a list of n computer system identifiers corresponding to n computer systems, wherein n is an integer greater than 1;
attempting to establish concurrent management sessions between the base computer system and a plurality of the n computer systems;
determining whether a total number of the plurality of computer systems having an attempted management session with the base computer is greater than a first threshold amount;
when the total number of the plurality of computer systems having an attempted management session with the base computer system is greater than the first threshold amount, determining an actual number of established management sessions;
when the actual number of established management sessions is greater than a second threshold amount, waiting for a predetermined period of time before attempting to establish any additional management sessions with any remaining computer systems of the n computer systems;
sending instructions to a plurality of the n computer systems, causing the plurality of n computer systems to perform the same management tasks concurrently;
wherein the base computer system further comprises at least one of a selected pre-script and a selected post-script.

13. The system of claim 12, wherein the program script is further configured to cause the one or more processors to attempt to establish concurrent management sessions between the base computer system and each of the n computer systems using the SSH protocol.

14. The system of claim 12, wherein the program script is further configured to cause the one or more processors to perform the steps of:
sending instructions to each of the plurality of computer systems, the instructions configured to cause the plurality of computer systems to perform management tasks that return data to the base computer system; and
executing one or more post scripts to perform analysis of the returned data.

15. The system of claim 14, wherein the program script is further configured to cause the one or more processors to receive a selection of the one or more post-scripts prior to attempting to establish any of the management sessions between the base computer system and the plurality of computer systems.

16. The system of claim 14, wherein the program script is further configured to cause the one or more processors to perform the steps of:
    receiving a selection of one or more pre-scripts prior to attempting to establish any of the management sessions between the base computer system and the plurality of computer systems; and
    executing the one or more pre-scripts prior to attempting to establish any of the management sessions between the base computer system and the plurality of computer systems.

17. The system of claim 12, wherein the n computer systems include at least two types of operating systems, and wherein the program script is further configured to cause the one or more processors to attempt to establish the concurrent management sessions by executing one or more scripts, including at least one script that is configured to cause each of the at least two types of operating systems to perform the same management tasks.

18. The method of claim 7, further including resetting the counter variable to 0 when the actual number of management sessions is less than the second threshold amount.

19. The method of claim 8, wherein the executed main program script causing the base computer system to send instructions further includes:
    reading a set of the n computer system identifiers from the list of n computer system identifiers;
    incrementing a counter variable after each computer system identifier from the set is read;
    using the counter variable to determine whether the total number of the plurality of computer systems having an attempted management session with the base computer system is greater than the first threshold amount; and
    resetting the counter variable to 0 when the actual number of management sessions is less than the second threshold amount.

20. The system of claim 12, wherein the program script is further configured to cause the one or more processors to:
    read a set of the n computer system identifiers from the list of n computer system identifiers;
    increment a counter variable after each computer system identifier from the set is read;
    use the counter variable to determine whether the total number of the plurality of computer systems having an attempted management session with the base computer system is greater than the first threshold amount; and
    resetting the counter variable to 0 when the actual number of management sessions is less than the second threshold amount.

* * * * *

UNITED STATES PATENT AND TRADEMARK OFFICE
CERTIFICATE OF CORRECTION

PATENT NO. : 7,827,264 B2
APPLICATION NO. : 11/711666
DATED : November 2, 2010
INVENTOR(S) : Swank Page 1 of 2

It is certified that error appears in the above-identified patent and that said Letters Patent is hereby corrected as shown below:

Please correct the References Cited as follows:
On the Title page, item (56), under "Other Publications", in Column 2, Line 11, delete "Livemore,"" and insert -- Livermore," --.

On the Title page, item (56), under "Other Publications", in Column 2, Line 16, delete "2007." and insert -- 2007, pp. 1-7. --.

Please correct the Claims as follows:
Column 8, line 48, in Claim 1, delete "systems;" and insert -- systems, wherein n is an integer greater than 1; --.

Column 8, line 49, in Claim 1, delete "session" and insert -- sessions --.

Column 8, line 64, in Claim 1, delete "an" and insert -- any --.

Column 9, line 5, in Claim 3, delete "post scripts" and insert -- post-scripts --.

Column 9, line 53, in Claim 8, delete "establish establishing" and insert -- establish --.

Column 9, line 56, in Claim 8, delete "the a" and insert -- a --.

Column 9, line 58, in Claim 8, delete "computer is" and insert -- computer system is --.

Column 9, line 60, in Claim 8, delete "when if" and insert -- when --.

Column 9, line 62, in Claim 8, delete "computer is" and insert -- computer system is --.

Column 10, line 34, in Claim 12, delete "computer is" and insert -- computer system is --.

Signed and Sealed this
Seventeenth Day of April, 2012

David J. Kappos
*Director of the United States Patent and Trademark Office*

Column 10, line 64, in Claim 14, delete "post scripts" and insert -- post-scripts --.